United States Patent
Feuerhuber

(10) Patent No.: US 11,951,714 B2
(45) Date of Patent: Apr. 9, 2024

(54) CLADDING ELEMENT

(71) Applicant: Richard Feuerhuber, Adlwang (AT)

(72) Inventor: Richard Feuerhuber, Adlwang (AT)

( * ) Notice: Subject to any disclaimer, the term of this patent is extended or adjusted under 35 U.S.C. 154(b) by 918 days.

(21) Appl. No.: 16/769,305

(22) PCT Filed: Nov. 23, 2018

(86) PCT No.: PCT/AT2018/050024
§ 371 (c)(1),
(2) Date: Jun. 3, 2020

(87) PCT Pub. No.: WO2019/109115
PCT Pub. Date: Jun. 13, 2019

(65) Prior Publication Data
US 2021/0170723 A1    Jun. 10, 2021

(30) Foreign Application Priority Data

Dec. 5, 2017   (AT) .............................. A 51008/2017

(51) Int. Cl.
*B32B 17/10*        (2006.01)
*B32B 3/06*         (2006.01)
(Continued)

(52) U.S. Cl.
CPC .......... *B32B 17/10293* (2013.01); *B32B 3/06* (2013.01); *B32B 3/30* (2013.01);
(Continued)

(58) Field of Classification Search
CPC ....... B32B 17/10293; B32B 3/06; B32B 3/30; B32B 17/10018; B32B 17/10036;
(Continued)

(56) References Cited

U.S. PATENT DOCUMENTS 9,567,191 B2    2/2017   Fried et al.
9,802,390 B2 *  10/2017  Ogawa .............. B32B 17/10293
(Continued)

FOREIGN PATENT DOCUMENTS

AT      518 542 B1     11/2017
AT      518542 B1 *    11/2017    ............... E04B 2/96
(Continued)

*Primary Examiner* — Brian D Mattei
*Assistant Examiner* — Omar F Hijaz
(74) *Attorney, Agent, or Firm* — Muirhead and Saturnelli, LLC

(57) ABSTRACT

A cladding element may have a composite body made up of two rectangular cover layers, of which at least the outer cover layer may consist of glass, and an inlay laminated in between the two cover layers. The composite body may include fastening tabs laminated in between the inner cover layer and the inlay on two opposing edge sides and an edge terminus profile protruding beyond the inner cover layer on one of the two edge sides between the fastening tabs, which may form an attachment web projecting from the protruding longitudinal edge for an identical cladding element. To provide advantageous construction conditions, the edge side opposite to the edge terminus profile may be covered by a cover strip frontally overlapped by the outer cover layer, which may be laminated like the edge terminus profile in between the inner cover layer and the inlay.

16 Claims, 3 Drawing Sheets

(51) Int. Cl.
  *B32B 3/30*   (2006.01)
  *E04C 2/54*   (2006.01)
  *E04F 13/08*  (2006.01)
  *E04F 13/14*  (2006.01)

(52) U.S. Cl.
  CPC .. *B32B 17/10018* (2013.01); *B32B 17/10036* (2013.01); *E04C 2/54* (2013.01); *E04F 13/085* (2013.01); *E04F 13/0866* (2013.01); *E04F 13/145* (2013.01); *B32B 2307/712* (2013.01); *B32B 2419/00* (2013.01); *B32B 2607/02* (2013.01)

(58) Field of Classification Search
  CPC .......... B32B 2307/712; B32B 2419/00; B32B 2607/02; E04C 2/54; E04F 13/085; E04F 13/0866; E04F 13/145; E04F 13/08; E04B 2/92; E04B 2/96
  See application file for complete search history.

(56) References Cited

U.S. PATENT DOCUMENTS

| | | | |
|---|---|---|---|
| 10,625,576 B2 * | 4/2020 | Kuster | B32B 17/10036 |
| 2010/0227135 A1 | 9/2010 | Takagi et al. | |

FOREIGN PATENT DOCUMENTS

| | | | | |
|---|---|---|---|---|
| DE | 199 58 372 C1 | 1/2001 | | |
| EP | 0 525 690 A2 | 2/1993 | | |
| EP | 2853388 A1 * | 4/2015 | ....... | B32B 17/10036 |
| WO | WO 2010/026050 A1 | 3/2010 | | |

* cited by examiner

CLADDING ELEMENT

TECHNICAL FIELD

The system described herein relates to a cladding element having a composite body made up of two rectangular cover layers, of which at least the outer cover layer consists of glass, and an inlay laminated in between the two cover layers, wherein the composite body comprises fastening tabs laminated in between the inner cover layer and the inlay on two opposing edge sides, and an edge terminus profile, which protrudes beyond the inner cover layer on one of the two edge sides between the fastening tabs, and which forms an attachment web projecting from the protruding longitudinal edge for an identical cladding element.

BACKGROUND OF THE INVENTION

To design cladding elements for façades, walls, and the like so that not only a versatile decorative design is permitted, but rather also the strength and safety requirements can be met, laminating an inlay between two cover layers, of which at least the outer cover layer consists of glass, with the aid of lamination films is known (AT 518 542 B1). Using this technique in conjunction with an edge terminus profile on the one side and a connecting strip provided between the cover layers on the opposing side, a composite body is obtained. This composite body can be fastened on a supporting framework by fastening tabs laminated in between the inner cover layer and the inlay at the edges extending transversely to the edge terminus profile and to the connecting strip. However, it is disadvantageous that, for example, the weather resistance is dependent on the care with which a continuous, materially-bonded connection has to be established by the lamination films between the individual layers even along the circumference of the composite body.

SUMMARY OF THE INVENTION

Described herein is a system including a cladding element, which forms a composite body made up of an inlay laminated in between two cover layers, in such a way that a less complex, weather-resistant construction may be ensured, without having to sacrifice simple assembly.

According to an embodiment of the system described herein, a façade element, for example of the type described in the Background section, may be provided, for which an edge side opposite to an edge terminus profile may be covered by a cover strip frontally overlapped by an outer cover layer, which may be laminated like the edge terminus profile in between an inner cover layer and an inlay. Fastening tabs may include a terminus strip covering end faces of the inlay and the outer cover layer.

By way of the cover strip provided frontally on the side of the composite body opposite to the edge terminus profile, the end faces of the inlay and the inner cover layer facing toward this cover strip may be covered. By so covering, only the end face of the outer cover layer may be exposed on this side of the composite body, because this outer cover layer made of glass may overlap the cover strip. The effect of this overlapping may be that, in the abutting region between two identical cladding elements of this type, only the frontal longitudinal edge of the edge terminus profile of the adjoining cladding element may appear, because the edge of the outer cover layer made of glass overlapping the cover strip may directly abut the edge terminus profile of the following cladding element in a series of cladding elements.

With the aid of the terminus strips provided on the fastening tabs, the end faces of the inlay and the outer cover layer not covered by the fastening tabs also may be covered, so that a composite body may be obtained that circumferentially has a weather-resistant cover in particular of the connecting layers formed with the aid of lamination films between the two cover layers and the inlay.

To provide advantageous construction conditions with respect to the connecting joint between two cladding elements in the region of the edge terminus profile, the edge of the outer cover layer overlapping the cover strip may protrude beyond the cover strip. If the edge terminus profile tapers from the attachment web toward the opposing longitudinal edge in accordance with the protrusion of the outer cover layer in relation to the cover strip, the edge terminus profile forming the upper edge of the composite body thus advantageously may be used as a sprayed water protection. Water may be prevented from reaching behind the cladding elements through the horizontal connecting joint by the terminus web, which may protrude upward in this case. The water penetrating into the connecting joint may be rather drained outward again as a consequence of the tapering edge terminus profile, which thus may drop off outward.

If the end faces of the composite body covered by the terminus strips of the fastening tabs extend inclined in relation to the cover layers, a butt joint overlap perpendicular to the cover layers thus may result in a simple manner, without special precautions having to be taken for this purpose.

To increase the pullout resistance in parallel to the cover layers when laminating in the fastening tabs, the fastening tabs may include a lamination web, which protrudes between the inner cover layer and the inlay, where the lamination web may be provided with interruptions. The connecting layer formed by corresponding lamination films may penetrate the interruptions and thus cause a form fit in relation to the lamination web to a certain extent. In a similar manner, the cover strip and the edge terminus profile may include a lamination web, which protrudes between the inner cover layer and the inlay and is provided with undercut edge recesses, to increase the pullout resistance.

BRIEF DESCRIPTION OF THE DRAWINGS

The subject matter of the system described herein is illustrated by way of example in the drawing. In the figures.

DESCRIPTION OF THE VARIOUS EMBODIMENTS

Figure 1:
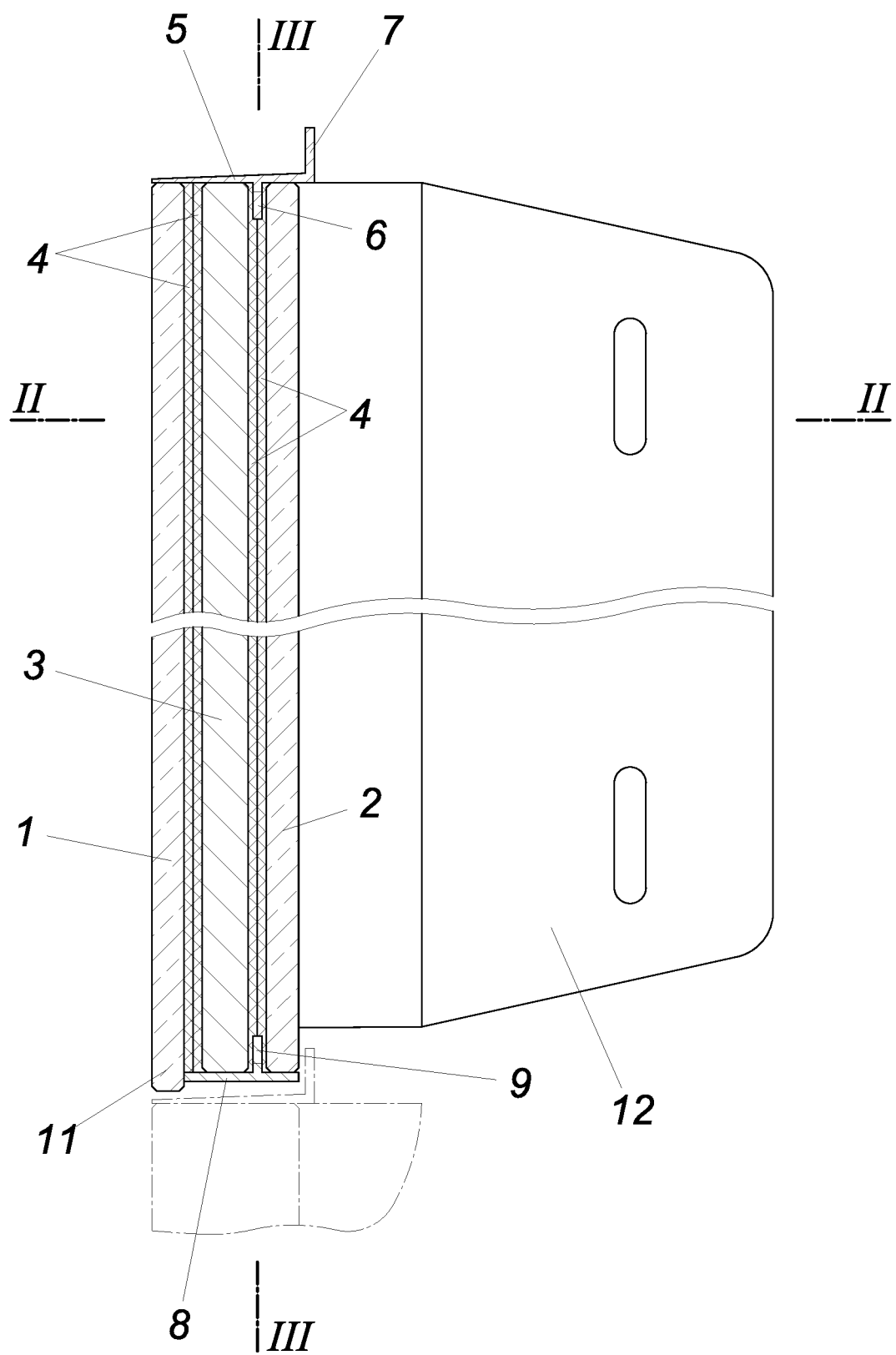
FIG. 1 shows a cladding element used as a wall cladding in a simplified vertical section, according to an embodiment of the system described herein.

A cladding element according to an embodiment of the system described herein includes two rectangular cover layers 1, 2 and an inlay 3, which is enclosed between the cover layers 1, 2, and which is shown as a single layer, but can also be formed to be multi-layered. Of the two cover layers 1, 2, at least the outer cover layer 1 may be manufactured from glass. The inner cover layer 2 may include (e.g., may consist of) a different material, but generally also may be formed by a glass pane. The connection between the two cover layers 1, 2 and the inlay 3 may be established via lamination films 4, which may be provided in two layers or multiple layers between the inlay 3 and the two cover layers 1, 2.

On an edge side, for example, on a longitudinal edge, the composite body formed by the two cover layers 1, 2 and by the inlay 3 laminated in between, may be terminated by an edge terminus profile 5, which may engage with a lamination web 6 between the cover layers 1, 2 and form a layer-parallel protruding attachment web 7 for an identical cladding element. A cover strip 8, which may be laminated using a lamination web 9 like the edge terminus profile 5 in between the inner cover layer 2 and the inlay 3, may be provided on the edge side of the composite body opposite to the edge terminus profile 5. For better anchoring in the connecting layer obtained by the lamination films 4 under pressure/vacuum and heat, the lamination webs 6, 9 may be provided with undercut edge recesses 10. Since the lamination webs 6, 9 may come to rest between two lamination films 4, the edge terminus profile 5 and the cover strip 8 may be laminated in between the lamination films 4 in a form-fitting manner upon curing of the lamination films 4 with an attachment to both the inner cover layer 2 and also to the inlay 3.

For differentiation from the edge terminus profile 5, however, the cover strip 8 may only extend over the inner cover layer 2 and the inlay 3, and may be overlapped by the outer cover layer 1 with a slight protrusion 11, as is apparent in particular from FIG. 1. Although the cover strip 8 may only extend up to the outer cover layer 1 made of glass, in particular the connecting layers resulting due to the lamination films 4 between the two cover layers 1, 2 and the inlay 3 may be covered by the cover strip 8 abutting the outer cover pane 1.

For fastening the cladding element, the composite body may include fastening tabs 12 on two opposing edge sides extending transversely to the edge terminus profile 5, which may include (e.g., consist of) an angled sheet-metal profile, and may engage using interruptions of a lamination web 13 into the intermediate space between the inner cover layer 2 and the inlay 3, in order to be laminated in like the edge section 5 and the cover strip 8. The fastening tabs 12, which may protrude beyond the inner cover layer 2 for fastening the cladding element on a framework, may only frontally cover the inner cover layer 2, however. For this reason, the fastening tabs 12 may be provided with a terminus strip 14, which may cover the end faces of the inlay 3 and the outer cover layer 1, so that the composite body is provided on all circumferential sides with a weather-resistant cover, which may neither negatively affects the appearance of the cladding element nor exerts an influence on the function.

As can be inferred from FIG. 1, an identical cladding element may be attached to a cladding element already fastened on a framework, which is indicated by dot-dash lines, and in turn may be connected to the framework, for example, by screwing on the fastening tabs 12, which may be provided with oblong holes for this purpose. It has been shown that the already fastened cladding element may simplify the placement of the new cladding element to be attached with its edge terminus profile 5, because the edge terminus profile 5 may be used as a directional stop for this purpose with its attachment web 7. The attachment web 7 of the edge terminus profile 5 overlapping the inner cover layer 2 of the adjoining cladding element on top additionally may form a sprayed-water protection in relation to the water penetrating through the butt joint between the cladding elements, which may not reach the rear side of the cladding element due to this attachment web.

If the edge terminus profile 5 tapers from the attachment web 7 toward the opposing longitudinal edge, and if the amount of this taper is adapted to the protrusion 11 of the outer cover layer 1 made of glass, the edge terminus profile 5 thus may form a gradient, which not only may ensure flowing back of the water penetrating into the connecting joint, but also may ensure that only a butt joint defined by the longitudinal edge of the edge terminus profile 5 remains between the outer cover layers 1 of two cladding elements adjoining one another in height.

Figure 2:
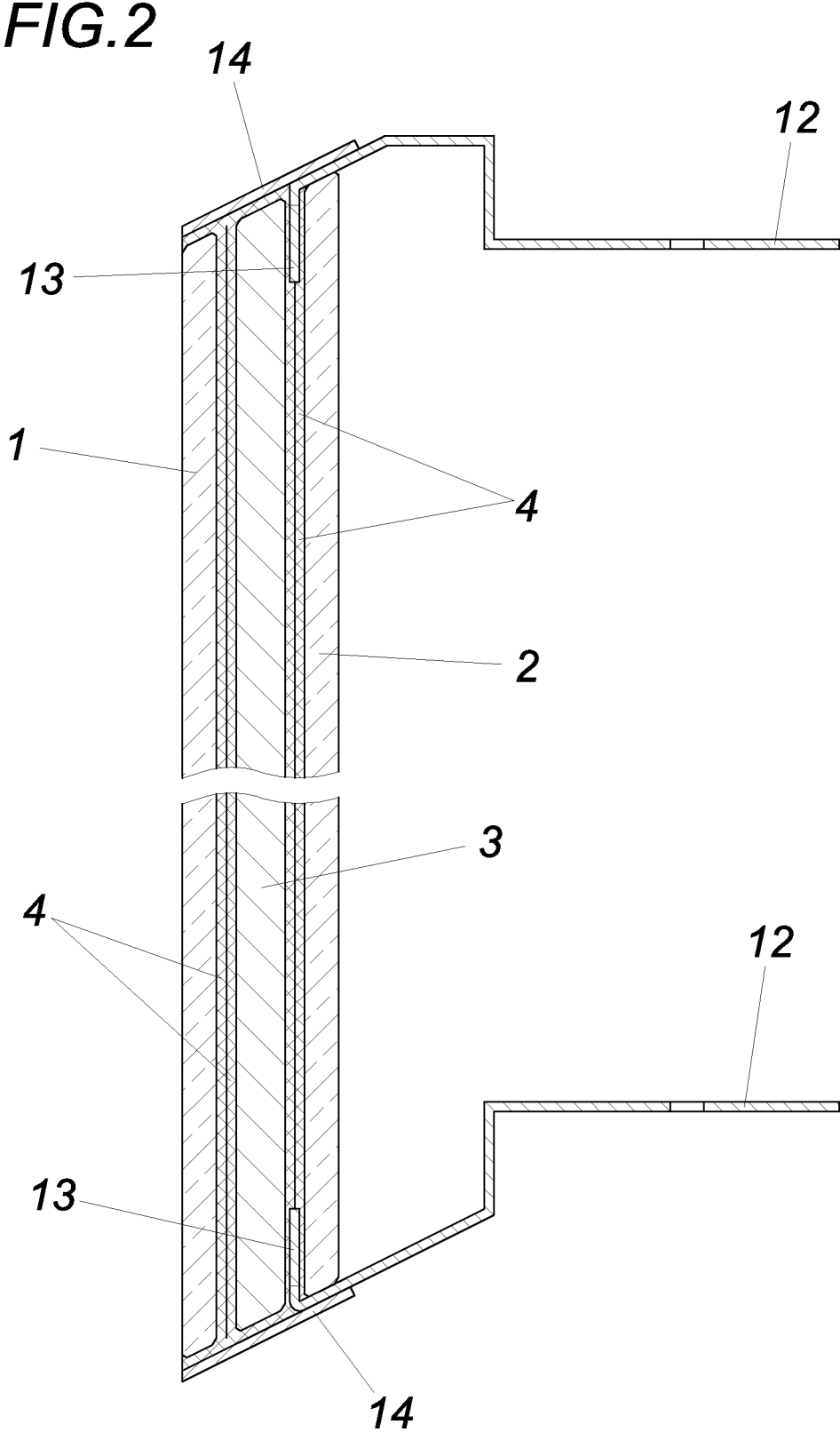
FIG. 2 shows the cladding element cladding element of FIG. 1 in a section along line II-II, according to an embodiment of the system described herein.
Figure 3:
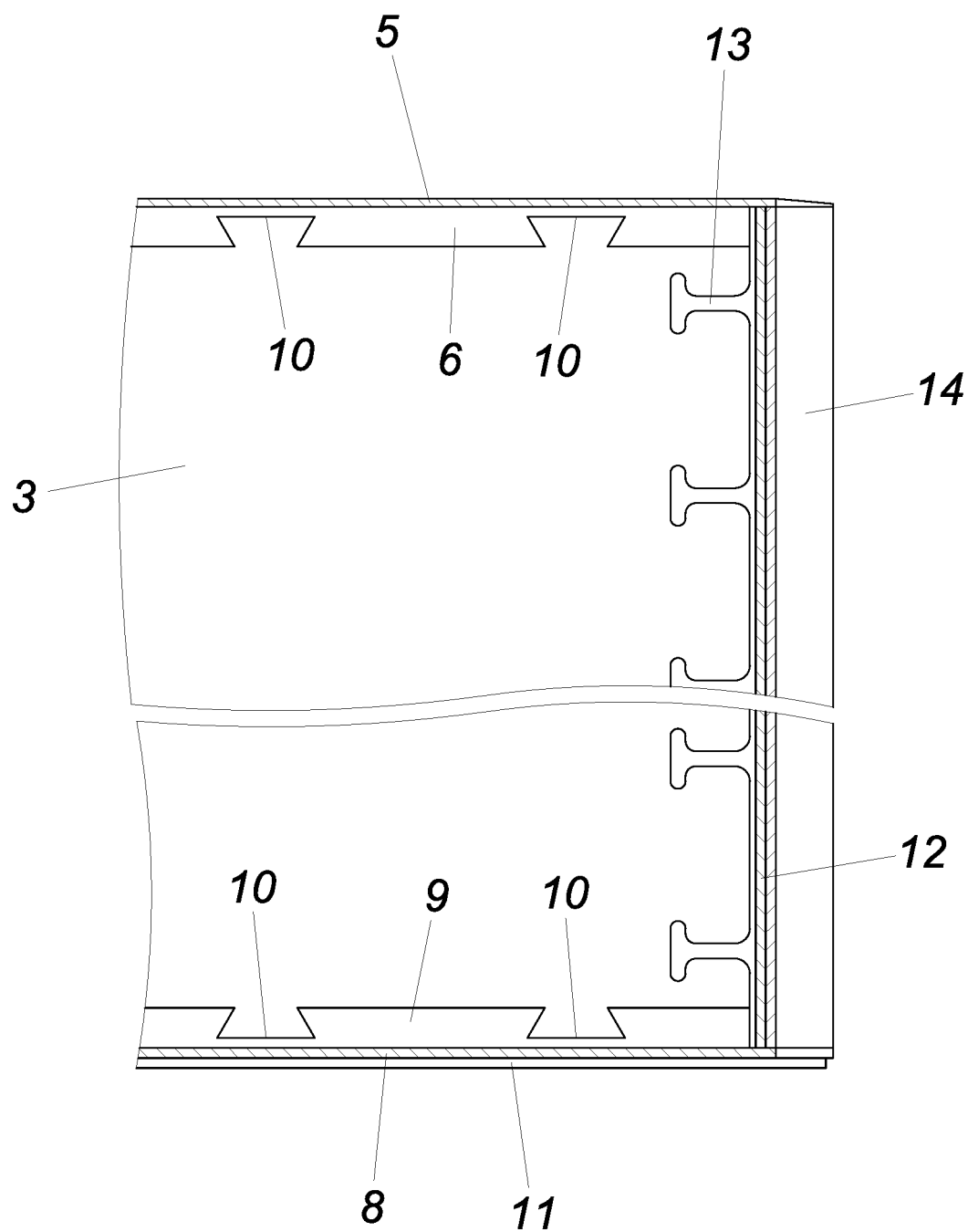
FIG. 3 shows a section of the cladding element of FIG. 1, along line III-III, according to an embodiment of the system described herein.

To enable an overlap of the butt joints resulting in the vertical direction perpendicular to the outer cover layer 1, without impairing the impression of a continuous glass façade extending over the individual cladding elements, the parallel end faces of the cladding elements may extend inclined in relation to the cover layers 1, 2 in the region of the fastening tabs 12, as is apparent from FIG. 2 in particular. This inclination of the end faces of the cladding element may cause a corresponding folding of the fastening tabs 12, so that if needed a flat contact of the fastening tabs 12 on fastening sections of the supporting framework may be achieved.

Other embodiments of the invention will be apparent to those skilled in the art from a consideration of the specification and/or an attempt to put into practice the invention disclosed herein. It is intended that the specification and examples be considered as illustrative examples only, with the true scope and spirit of the invention being indicated by the following claims.

The invention claimed is:

1. A cladding element comprising:
   a composite body including:
   two rectangular cover layers including an inner cover layer and an outer cover layer, of which at least the outer cover layer is manufactured from glass,
   an inlay laminated in between the two cover layers,
   fastening tabs laminated in between the inner cover layer and the inlay on two opposing edge sides of the composite body, and
   an edge terminus profile protruding beyond the inner cover layer on one of the two opposing edge sides between the fastening tabs, which forms an attachment web projecting from a protruding longitudinal edge of the composite body for an identical cladding element; and
   a cover strip covering an edge side of the two opposing edge sides that is opposite to the edge terminus profile and covering end faces of the inlay and the inner cover layer, wherein the cover strip is frontally overlapped by a protrusion of the outer cover layer, and is laminated in between the inner cover layer and the inlay, wherein the fastening tabs include a terminus strip covering an end face of the inlay and an end face of the outer cover layer.

2. A cladding element, comprising:
   a composite body including:
   two rectangular cover layers including an inner cover layer and an outer cover layer, of which at least the outer cover layer is manufactured from glass,
   an inlay laminated in between the two cover layers,
   fastening tabs laminated in between the inner cover layer and the inlay on two opposing edge sides of the composite body, and
   an edge terminus profile protruding beyond the inner cover layer on one of the two opposing edge sides between the fastening tabs, which forms an attachment web projecting from a protruding longitudinal edge of the composite body for an identical cladding element; and a cover strip covering an edge side of the two opposing edge sides that is opposite to the edge terminus profile and covering end faces of the inlay and the inner cover layer, wherein the cover strip is frontally overlapped by the outer cover layer, and is laminated in between the inner cover layer and the inlay, wherein the fastening tabs include a terminus strip covering an end face of the inlay and an end face of the outer cover layer, wherein an edge of the outer cover layer overlapping the cover strip protrudes beyond the cover strip, and the edge terminus profile tapers from the attachment web toward an opposing longitudinal edge of the edge terminus profile with an amount of taper that is adapted to a protrusion of the outer cover layer in relation to the cover strip.

3. A cladding element, comprising:
a composite body including:
two rectangular cover layers including an inner cover layer and an outer cover layer, of which at least the outer cover layer is manufactured from glass,
an inlay laminated in between the two cover layers,
fastening tabs laminated in between the inner cover layer and the inlay on two opposing edge sides of the composite body, and
an edge terminus profile protruding beyond the inner cover layer on one of the two opposing edge sides between the fastening tabs, which forms an attachment web projecting from a protruding longitudinal edge of the composite body for an identical cladding element; and
a cover strip covering an edge side of the two opposing edge sides that is opposite to the edge terminus profile, wherein the cover strip is frontally overlapped by the outer cover layer, and is laminated in between the inner cover layer and the inlay, wherein the fastening tabs include a terminus strip covering an end face of the inlay and an end face of the outer cover layer, wherein the end face of the inlay and the end face of the outer cover layer covered by the terminus strip of the fastening tabs extend inclined in relation to the two rectangular cover layers.

4. The cladding element according to claim 1, wherein the fastening tabs comprise a lamination web, which protrudes between the inner cover layer and the inlay and is provided with interruptions.

5. The cladding element according to claim 1, wherein the cover strip and the edge terminus profile comprise a lamination web, which protrudes between the inner cover layer and the inlay, and is provided with undercut edge recesses.

6. The cladding element according to claim 2, wherein the fastening tabs comprise a lamination web, which protrudes between the inner cover layer and the inlay and is provided with interruptions.

7. The cladding element according to claim 6, wherein the cover strip and the edge terminus profile comprise a lamination web, which protrudes between the inner cover layer and the inlay, and is provided with undercut edge recesses.

8. The cladding element according to claim 2, wherein the cover strip and the edge terminus profile comprise a lamination web, which protrudes between the inner cover layer and the inlay, and is provided with undercut edge recesses.

9. The cladding element according to claim 4, wherein the cover strip and the edge terminus profile comprise a lamination web, which protrudes between the inner cover layer and the inlay, and is provided with undercut edge recesses.

10. The cladding element according to claim 3, wherein an edge of the outer cover layer overlapping the cover strip protrudes beyond the cover strip, and the edge terminus profile tapers from the attachment web toward an opposing longitudinal edge of the edge terminus profile with an amount of taper that is adapted to a protrusion of the outer cover layer in relation to the cover strip.

11. The cladding element according to claim 10, wherein the fastening tabs comprise a lamination web, which protrudes between the inner cover layer and the inlay and is provided with interruptions.

12. The cladding element according to claim 11, wherein the cover strip and the edge terminus profile comprise a lamination web, which protrudes between the inner cover layer and the inlay, and is provided with undercut edge recesses.

13. The cladding element according to claim 3, wherein the fastening tabs comprise a lamination web, which protrudes between the inner cover layer and the inlay and is provided with interruptions.

14. The cladding element according to claim 13, wherein the cover strip and the edge terminus profile comprise a lamination web, which protrudes between the inner cover layer and the inlay, and is provided with undercut edge recesses.

15. The cladding element according to claim 3, wherein the cover strip and the edge terminus profile comprise a lamination web, which protrudes between the inner cover layer and the inlay, and is provided with undercut edge recesses.

16. The cladding element according to claim 1, wherein the cover strip extends over the inner cover layer and the inlay.

* * * * *